(No Model.)

E. A. STREETER.
FOOT SUPPORT FOR TELEGRAPH POLES.

No. 471,626. Patented Mar. 29, 1892.

Witnesses:

Inventor:
Emma A. Streeter
By William B. Greeley
Attorney.

UNITED STATES PATENT OFFICE.

EMMA A. STREETER, OF WHITE PLAINS, NEW YORK.

FOOT-SUPPORT FOR TELEGRAPH-POLES.

SPECIFICATION forming part of Letters Patent No. 471,626, dated March 29, 1892.

Application filed December 7, 1891. Serial No. 414,228. (No model.)

*To all whom it may concern:*

Be it known that I, EMMA A. STREETER, of White Plains, in the county of Westchester and State of New York, have invented a new and useful Improvement in Foot-Supports for Climbing Telegraph-Poles; and I do hereby declare that the following is a full and exact description thereof, reference being had to the accompanying drawings, and to the letters of reference marked thereon, making a part of this specification.

My invention is intended to provide an improved foot-support for use in climbing telegraph and other poles and masts, and to insure in such a support greater stability and security and a broader and firmer tread for the foot than are afforded by the spikes or rounds now used for such purposes.

Figure 1:
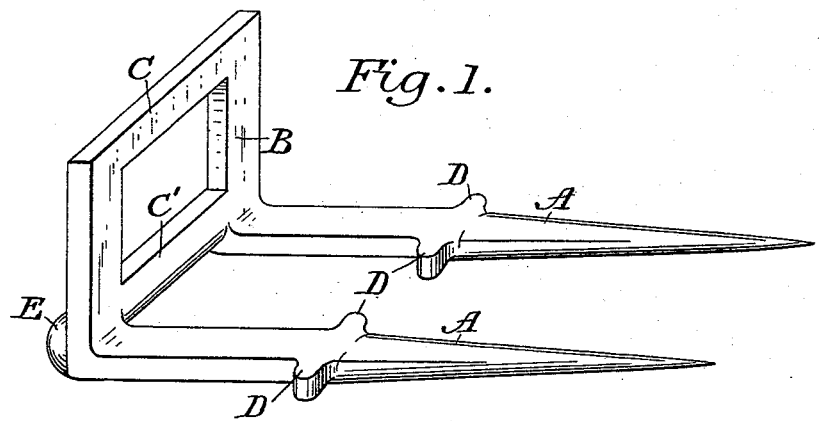
Figure 2:
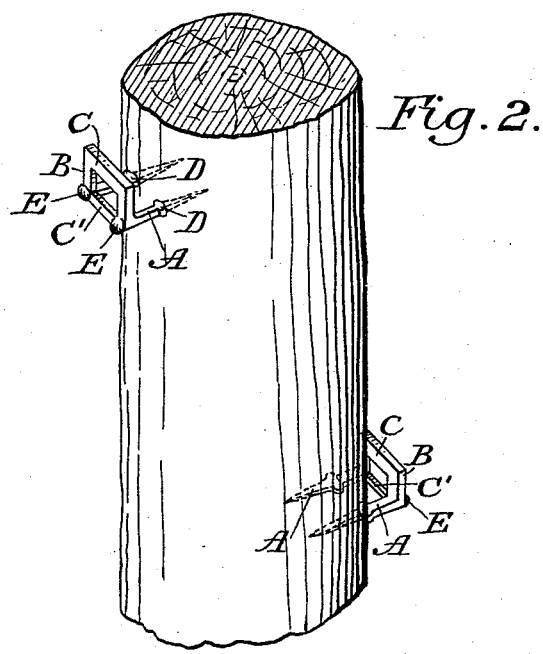

In the drawings, Figure 1 is a view in perspective of my improved device, and Fig. 2 represents two of the improved spikes in position on a pole.

My invention, as shown in the drawings, consists of a double spike having two prongs A A, sharpened at their inner ends to permit them to be driven into the pole, and having their outer ends turned upward and connected by a horizontal cross-bar C to form a foot-guard B. To insure greater rigidity, the prongs A A may be further connected near their outer ends by a cross-bar C'. The prongs A A are furnished with shoulders D D, placed at such a point thereon as to limit the penetration of said prongs to the extent necessary to secure stability and rigidity of the device when in position and to enable it to offer sufficient resistance to vertical pressure and to furnish a foot-support of sufficient breadth between the pole and the upturned guard B.

On the outside of the device, and respectively on the horizontal axes of the prongs A A, are placed the knobs E E for convenience in driving in the prongs A A and for the purpose of protecting the remainder of the structure from being defaced or bent out of shape in that operation.

The device in use is hammered or driven into position in the same manner as the single spikes now used, and has the advantages, obvious from the construction shown, of being exceedingly firm and stable when in position and of increased safety when in use. The foot-support is broad and firm and being double is safer and easier for the foot than a single spike or round, and is held at its proper width by the shoulders D D, which prevent the prongs A A from being driven in too far. The upturned outer ends of the prongs A A form a guard, which effectually protects the person using the device from the danger of slipping over the end of the foot-support.

I claim as my invention—

1. A spike for climbing poles, composed of prongs adapted to be driven into the pole and to form a substantially horizontal rest for the foot, said prongs being upwardly turned near their outer ends to form a foot-guard, and a cross-bar connecting said prongs at the extremity of their upwardly-turned ends, substantially as shown and described.

2. A spike for climbing poles, composed of prongs adapted to be driven into the pole and adapted to form a substantially horizontal rest for the foot, said prongs being furnished with shoulders to limit their penetration and being upwardly turned near their outer ends to form a foot-guard, and a cross-bar connecting said prongs at the extremities of their upwardly-turned ends, substantially as shown and described.

3. A spike for climbing poles, composed of prongs adapted to be driven into the pole and adapted to form a substantially horizontal rest for the foot, said prongs being furnished with shoulders to limit their penetration and being upwardly turned near their outer ends to form a foot-guard, said prongs being also provided with knobs at the outer extremities of their horizontal portions and connected at their extremities by a cross-bar, and a cross-bar connecting said prongs at the extremities of their upwardly-turned ends, substantially as shown and described.

In testimony whereof I have signed my name to this specification in the presence of two subscribing witnesses.

EMMA A. STREETER.

Witnesses:
A. N. JESBERA,
E. A. GREELEY.